United States Patent
Harding et al.

(10) Patent No.: US 7,015,473 B2
(45) Date of Patent: Mar. 21, 2006

(54) METHOD AND APPARATUS FOR INTERNAL FEATURE RECONSTRUCTION

(75) Inventors: Kevin George Harding, Niskayuna, NY (US); Alexander Bernard Flavian Rebello, Charlotte, NC (US); Donald Robert Howard, Troy, NY (US)

(73) Assignee: General Electric Company, Niskayuna, NY (US)

( * ) Notice: Subject to any disclaimer, the term of this patent is extended or adjusted under 35 U.S.C. 154(b) by 304 days.

(21) Appl. No.: 10/676,990

(22) Filed: Sep. 30, 2003

(65) Prior Publication Data

US 2005/0067568 A1    Mar. 31, 2005

(51) Int. Cl.
*G01J 5/02*    (2006.01)

(52) U.S. Cl. .................. 250/341.1; 250/341.6

(58) Field of Classification Search ............. 250/341.1, 250/341.6
See application file for complete search history.

(56) References Cited

U.S. PATENT DOCUMENTS

| | | | |
|---|---|---|---|
| 3,566,669 A * | 3/1971 | Lawrence et al. ............. 374/5 |
| 4,969,110 A | 11/1990 | Little et al. | |
| 5,334,934 A | 8/1994 | Viertl | |
| 5,345,514 A | 9/1994 | Mahdavieh et al. | |
| 5,418,547 A | 5/1995 | Mizukata et al. | |
| 6,047,041 A | 4/2000 | Ellinger | |
| 6,367,969 B1 | 4/2002 | Ringermacher et al. | |
| 6,394,646 B1 | 5/2002 | Ringermacher et al. | |
| 2002/0095267 A1 | 7/2002 | Knorpp et al. | |
| 2002/0128797 A1 | 9/2002 | Sun | |
| 2003/0113006 A1 * | 6/2003 | Berestov ...................... 382/131 |
| 2005/0028482 A1 * | 2/2005 | Cable et al. ................ 52/749.1 |
| 2005/0180623 A1 * | 8/2005 | Mueller et al. ............. 382/154 |

FOREIGN PATENT DOCUMENTS

EP    0304708    3/1989

OTHER PUBLICATIONS

T. M. Liou et al., "Heat Transfer and Fluid Flow in a Square Duct with 12 Different Shaped Vortex Generators", Transactions of the ASME, Journal of the Heat Transfer, vol. 122, No. 2, pp. 327-335, May 2000.

T. Varady et al., "Revers Engineering of Geometric Models an Introduction", Computer-Aided Design 1997, vol. 29, No. 4, pp. 255-268, 1997.

Z. Li et al, "Point Cloud to Surface Best-Fitting", Proceedings of the Second International Corporation Rapid Prototyping & Manufacturing 2002, Beijing, pp. 162-166.

I.I. Esat et al., "Surface alignment based on the moment of inertia and improved least-squares methods", Proc Institute Mech Engrs, vol. 214 Part B, IMechE 2000, pp. 547-554.

R. Bergevin et al., "Registering Range Views of Multipart Objects", Computer Vision & Image Understanding, vol. 61, No. 1, pp. 1-16, Jan. 1995.

(Continued)

*Primary Examiner*—David Porta
*Assistant Examiner*—Mindy Vu
(74) *Attorney, Agent, or Firm*—Penny A. Clarke; Patrick K. Patnode (57) ABSTRACT

A method for reconstructing internal surface geometry of a part includes registering a thickness map for the part with external surface data for the part. The thickness map has a number of thickness data. Internal surface data is generated using the thickness map and the external surface data to reconstruct the internal surface geometry.

27 Claims, 4 Drawing Sheets

OTHER PUBLICATIONS

J. - Y. Lai et al., :Registration and Data Merging for Multiple Sets of Scan Data:, The Int. Journal Adv. Manufacturing Technology, 1999, 15:54-63.

B.K.P. Horn et al., "Closed-form Solution of Absolute Orientation Using Othonormal Matrices," Journal of the Optical Society, vol. 5, No. 7, pp. 1127-1135, Jul. 1988.

R. Fletcher et al., A rapidly convergent descent method for minimization:, The Computer Journal, vol. 6, ISSN 0010-4620 OCLC 156400, 1963, pp. 163-168.

V. Conan et al., "Multiresolution registration of 3D range images of free-form surfaces", SPIE vol. 3204, 1997, pp. 165-172.

H. I. Ringermacher et al., "Towards a Flat-Bottom Hold Standard for Thermal Imaging", Review of Progress in Quantitative Nondestructive Evaluation, vol. 17, Plenum Press, New York, 1998, pp. 425-429.

EP Search Report, EP04255955, Feb. 8, 2005.

* cited by examiner

Fig. 4

METHOD AND APPARATUS FOR INTERNAL FEATURE RECONSTRUCTION

BACKGROUND OF THE INVENTION

The present invention relates generally to methods and systems for non-destructive inspection and, more specifically to non-destructive inspection methods and systems for reconstructing internal features of an object.

Reverse engineering is an important approach in product design and manufacturing. Unlike traditional product design, reverse engineering mainly focuses on turning physical models into engineering design concepts or digital models. A typical reverse engineering process includes four major steps. The first step is to measure both internal and external features, and obtain a digital representation of the physical part. After the data is acquired, post processing the data is required, which includes registering data from different measurement systems or view directions, detecting and removing outliers, filtering noise and smoothing the inspection data. Based on the processed data, geometric features are extracted. Finally, a solid model is created based on the extracted geometric representation.

Because the accuracy of the measurement data directly affects the quality of the final model, it is important to select the proper measurement methods and establish an effective measurement strategy. There are various methods, contact and non-contact, to obtain a digital representation of a physical part. Contact methods provide high accuracy but are cumbersome and time consuming. Non-contact methods are generally much faster than the contact methods. Non-contact methods, such as optical metrology, are widely used to measure the external features.

There are many ways to measure external structures of a mechanical part. Coordinate measurement machine (CMM), laser scanners or other optical measurement methods are suitable to obtain such information. But measuring the internal structure of the part is very difficult because of the non-accessibility of the internal structures. Currently, two broad methodologies are primarily employed to measure internal structures. One is a destructive method, involving cutting up the part slice by slice and then measuring each slice to determine the internal features, whereas the other methodology is nondestructive and uses non-intrusive techniques, such as an industrial computed tomography (CT) machine to measure the part. There are drawbacks to both of these methodologies. The destructive method deforms the part before it is measured and fails to capture detailed internal structures. In addition, the part is not re-usable, and intensive labor is involved. Although CT is a nondestructive measurement method, its measurement error is large (greater than 5 mils for most systems), and this low accuracy may lead to inaccuracy in the final model.

It is therefore desirable to measure internal structures with high accuracy using a non-destructive method.

BRIEF DESCRIPTION OF THE INVENTION

Briefly, in accordance with one aspect of the present invention, a method for reconstructing the internal surface geometry 10 of a part 20 includes registering a thickness map 30 for the part with external surface data 40 for the part. The thickness map has a number of thickness data 32. The internal surface data 12 is generated using the thickness map 30 and the external surface data 40 to reconstruct the internal surface geometry.

According to another embodiment of the present invention, an inspection method for reconstructing internal surface geometry 10 for a part 20 includes obtaining external surface data 40 for the part 20, collecting a sequence of images of the part 20 using an imager 50 and generating a thickness map 30 for the part from this sequence of images. The thickness map 30 includes multiple thickness data 32. The thickness map 30 is registered with the external surface data 40, and a set of internal surface data 12 is generated using the thickness map 30 and the external surface data 40.

According to yet another embodiment of the instant invention, an inspection system 90 for reconstructing an internal surface geometry 10 of a part 20 includes an artifact 60 having a known geometry and known dimensions. A fixture arrangement 58 positions the artifact relative to the part, and an imager 50 obtains thickness data 30 of the part and the artifact.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
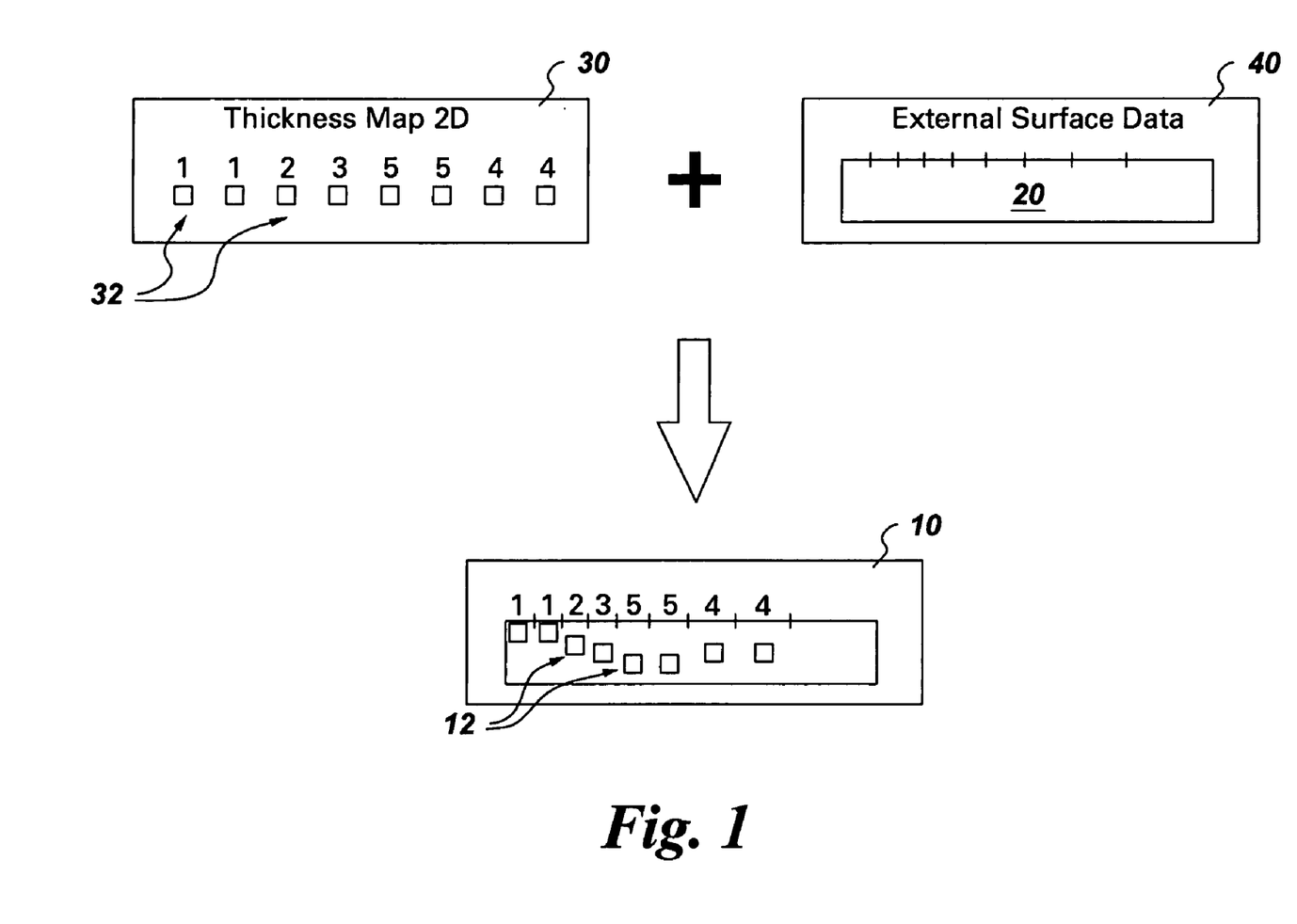
FIG. 1 is a schematic representation of a reconstruction of the internal surface geometry of a part using a thickness map and external surface data.

A schematic representation of a method embodiment for reconstructing an internal surface geometry 10, corresponding to an internal cavity of a part 20 such as, for example, a turbine blade, is shown in FIG. 1. Information from a thickness map 30, representing the thickness of the part 20 at particular locations on the part, and external surface data 40 representing the exterior surface profile of the part 20 are combined to generate the internal surface geometry 10 of the part. In general, the thickness map 30 is a set of thickness data 32 elements that represent the thickness at specific locations on the part. Registering the thickness map 30 with the external surface data 40 requires accurate alignment between the two, and results in a set of internal surface data elements 12, which are logically arranged to represent a reconstructed internal surface geometry 10.

As used herein, the term "external surface data" means data representing the surface profile of a physical object, and is consequently three-dimensional (3 D). Typically, external surface data may be in a digital format, obtained from either contact or non-contact profile generation methods, forming a digital representation of a physical object. External surface data may be obtained using methods such as optical metrology, laser scanning, coordinate measurement machine (CMM) measurement, among others, and all such techniques are contemplated herein. These and other metrology systems include touch probes, point scanners, line scanners and area scanners. External surface data may also be obtained from CAD or other similar information about the physical object.

For the purposes of the present discussion, the "thickness" of an object refers to a front wall or surface thickness in the context of a hollow or semi-hollow object. As used herein, front wall refers to the wall of the object facing an imager, which is used to collect thermal images of the object, and is discussed below with reference to FIG. 2. As used herein, the term "thickness data" means data representing the thickness of a physical object at particular locations. It may be noted here, that the thickness data is two-dimensional (2 D) in nature. Further a set of thickness data logically combines to form a 2 D "thickness map" representing its thickness of the physical object. The thickness data and hence the thickness map may typically be obtained in digital format from non-destructive internal imaging techniques, such as thermal imaging among others. Thermal imaging uses the premise that the surface temperature of a solid is representative of the heat flow through the solid. One of the thermal imaging techniques, Infra Red (IR) thermal imaging observes surface temperature changes of an object to gather information about its internal structure. High power flash lamps, (such as manufactured by Speedotron, Corp. in Chicago, Ill.), halogen lamps or arc lamps are used to apply an energy source at the surface of the material in a short period of time. Energy from such lamps is absorbed at the surface, and the heat is conducted through the material at a rate, which is dependent on the material's thermal properties. For the purposes of the present discussion, "lamps" will be understood to include energy sources for irradiating an object, such as flash lamps, halogen lamps, arc lamps among others. An IR camera captures the temperature decay at the sample's surface over time, and, from this information, the object thickness, material properties and the presence of certain defects can be determined. Although the examples are directed to IR thermal imaging for generating thickness data, use of other techniques, such as for example, Ultra Sound, Computed Tomography, is contemplated herein.

As used herein, the term "registration" refers to mapping of corresponding data elements from a thickness map with external surface data for a physical object. The registration process results in the reconstruction of the internal geometry for the physical object.

Figure 2:
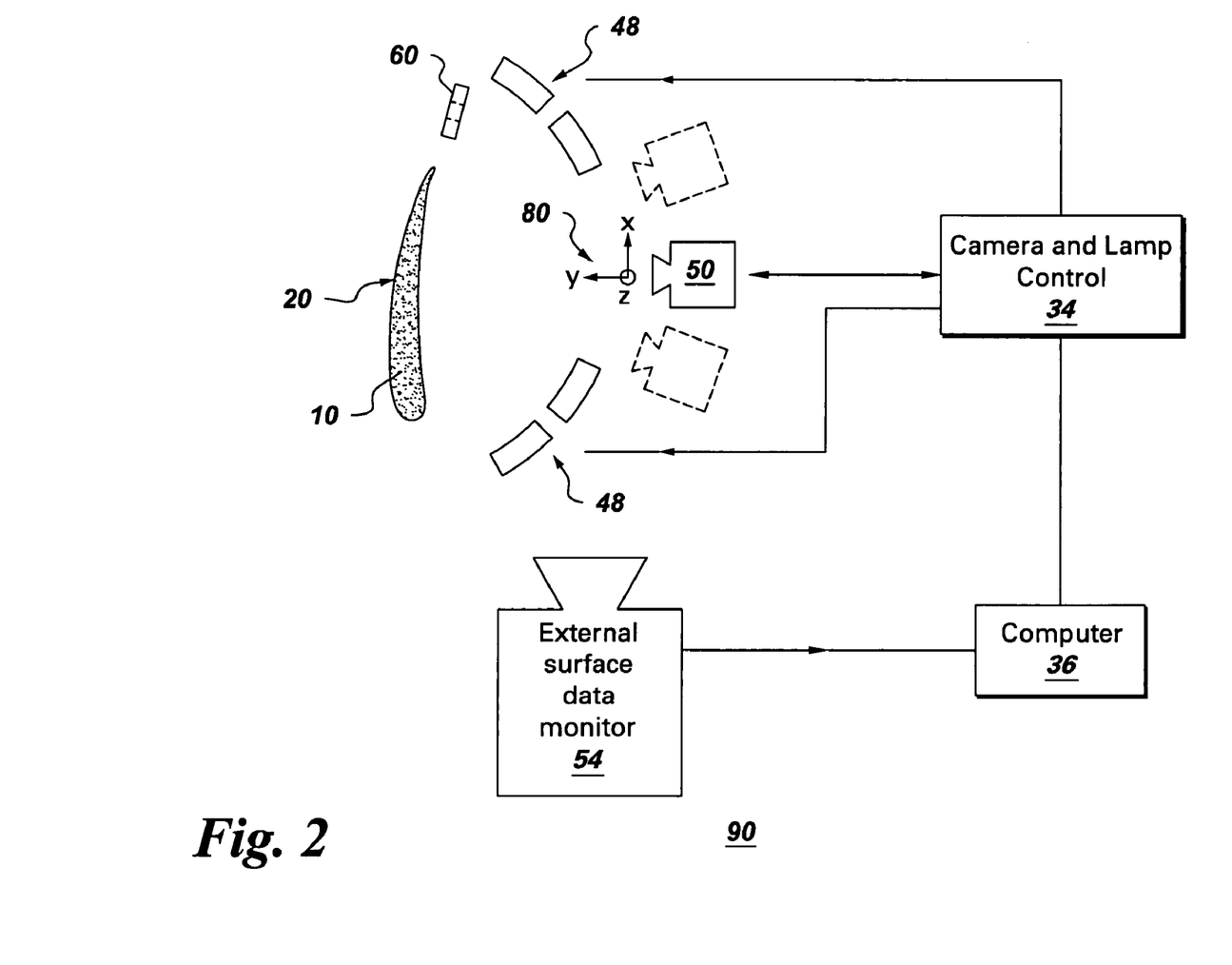
FIG. 2 schematically represents an apparatus for reconstructing the internal surface geometry of a part.

Referring now to FIG. 2, an internal feature reconstruction system 90 embodiment is described. A part 20 having an internal geometry 10 is positioned along with an artifact 60, such that the artifact 60 and the part 20 have a fixed positional relationship. A set of lamps 48, such as, for example, eight high power lamps, is used to irradiate the surface of the part 20 and the artifact 60 in a short period of time. An imager 50, having a coordinate system 80, is positioned facing the part 20 and the artifact 60, to collect thermal images of the part and the artifact. The imager 50 is typically an infrared camera that sequentially captures the thermal images of the part 20 and the artifact 60. For the exemplary embodiment of FIG. 2, the lamps 48 and imager 50 are electronically coupled with a camera and lamp control module 34, which controls the flash lamp firing and imager operation. For this exemplary embodiment, the camera and lamp control module 34 provides a sequence of thermal images to a computer 36, which is configured to generate thickness data 32 by processing these thermal images. The computer 36 also receives external surface data 40, for example from an external surface data monitor 54 or from CAD drawings. It is appreciated here that the thickness data 32 corresponding to both the part 20 and the artifact 60 is captured by the imager 50, and accordingly, the resulting thickness map 30 comprises regions corresponding to the part 20 and the artifact 60, that are referred to as a part region 82 and an artifact region 84, respectively, of the thickness map 30, and discussed in detail with reference to FIGS. 5–7.

As used herein, the term "computer" means a programmable device that responds to a specific set of instructions. Most computers typically include: a memory that enables a computer to store, at least temporarily, data and programs; a mass storage device that allows a computer to permanently retain large amounts of data (common mass storage devices include disk drives and tape drives); an input device, for example, a keyboard or mouse, through which data and instructions enter a computer; an output device for example a display, screen or printer or other device that allows one to see what the computer has accomplished; and a central processing unit (CPU), the component that executes instructions.

For the exemplary embodiment of FIG. 2, the computer 36 is electronically coupled with the camera and lamp control module 34 and the external surface data monitor 54. The computer 36 is configured to generate a thickness map 30 from the thickness data 32 and to register the thickness map 30 to the external surface data 40 in order to generate internal surface data 12 of the part 20 for reconstructing its internal surface geometry 10. The computer 36 is further configured to extrapolate the artifact region of the thickness map 30 to a 3 D point cloud, and best fit the 3 D point cloud to artifact's external surface data 42, and generate a coordinate transformation matrix. The external surface data generator 54 may include, as discussed above, a coordinate measurement machine (CMM), laser scanners, light gage or other optical measurement instruments. Further, in some embodiments of the invention, the camera and lamp control module 34, may be included within the computer 36. In addition, the system 90 may include a fixture arrangement, which is not shown in FIG. 2 but is discussed below with reference to FIG. 3.

Figure 3:
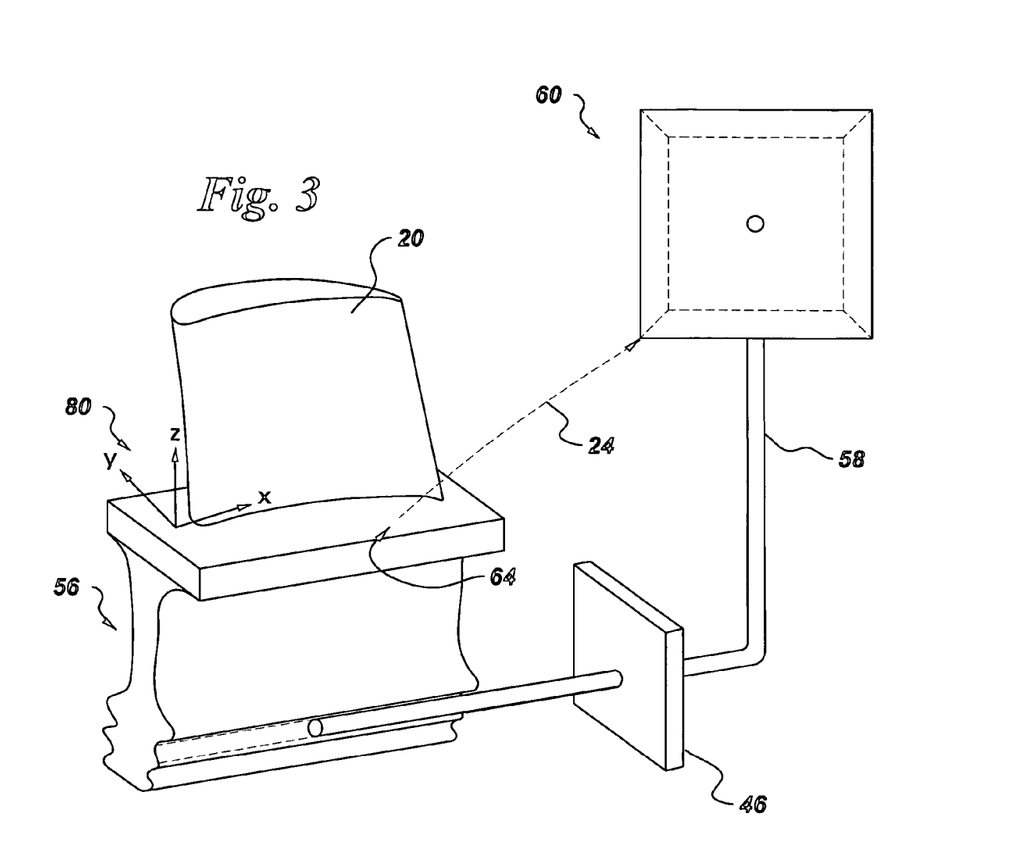
FIG. 3 is a perspective view of an exemplary part, base, fixture arrangement and artifact assembly.

FIG. 3 shows a perspective view of an arrangement of the part 20 and artifact 60, in accordance with an embodiment of the present invention. The coordinate system 80 of the imager (not shown in FIG. 3) is indicated in FIG. 3. The artifact 60 and the part 20 are relationally positioned by a (meaning at least one) fixture arrangement 58. An exemplary fixture arrangement 58 is a rigid mechanical structure, capable of maintaining a substantially fixed positional relationship between the part 20 and the artifact 60. For example, the artifact 60 may be mounted on the fixture arrangement 58, which is free to move in one direction along the base 56, on which the part 20 is mounted. Once a suitable position between the part and the artifact is determined, the movement of the fixture arrangement 58 is restricted using a lock 46. This method may also be referred to as precision fixturing. However, other methods can be used for maintaining a fixed positional relationship between the artifact and the part, and such methods are within the scope of the present invention.

Figure 4:
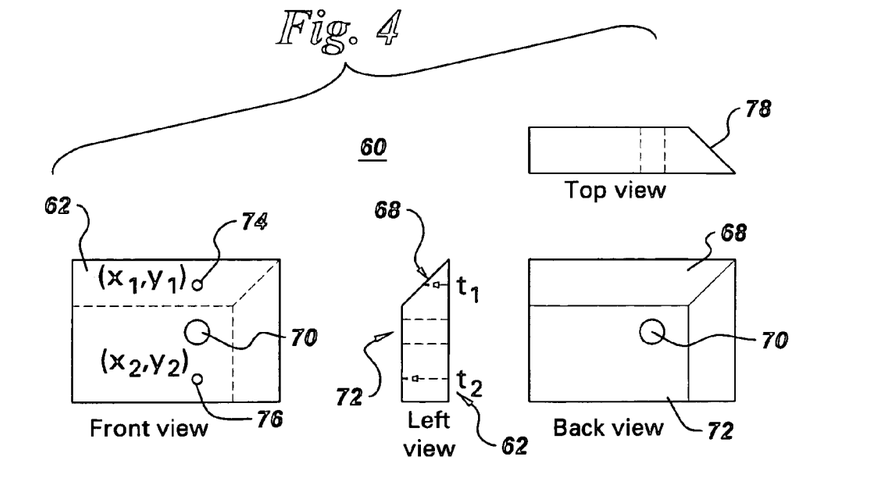
FIG. 4 shows multiple views of an exemplary artifact.

FIG. 4 shows an exemplary artifact 60, in distinct views. The artifact 60 has at least one land 62, which is a substantially planar surface and forms a face of the artifact. The artifact 60 also has at least one wedge 68, which is a substantially planar surface, and intersects the land 62 at an angle. The artifact 60 further comprises a cavity, such as a hole 70 in the artifact 60. The exemplary artifact 60 shown in the figure, has two lands 62, 72 forming respectively opposite substantially parallel faces. Two wedges 68, 78 intersect the lands 62, 72 at an angle and intersect each other at substantially right angles. However other relative configurations between the wedges are contemplated herein. Points 74 ($x_1, y_1$) and 76 ($x_2, y_2$) are illustrated on the artifact, with their respective thicknesses indicated as $t_1$ and $t_2$. The hole 70 is a through-hole, with an axis (not shown) substantially perpendicular to the land faces 62, 72. The hole 70 serves to align the artifact 60 with the imager. The artifact 60 may have a well-known geometry by virtue of precision machining, from which geometry data for the artifact 60 may be obtained. Alternatively, geometry data of the artifact may be obtained by performing measurements on the artifact, in cases where the geometry of the artifact 60 is unknown. It is appreciated here that the geometry data of the artifact includes its external surface data 42. For the purpose of this discussion, the term 'geometry data' and 'external surface data for the artifact' are used interchangeably.

An exemplary method for reconstructing the internal surface geometry of a part 20 is described with reference to FIGS. 2 and 3. As indicated in FIG. 3, for example, the artifact 60 is positioned with an orientation relative to the part 20, and a datum 64 (a reference feature) is selected on the part 20. For the exemplary embodiment of FIG. 3, the artifact 60 is attached to the part 20 using a precision fixturing arrangement as discussed earlier, and in this manner, relative motion between the artifact 60 and the part 20 (and hence the datum) is restricted. Further, for this exemplary embodiment, the front view of the artifact 60 is aligned to be perpendicular to the axis of sight of the imager 50, using the hole 70. According to a more particular embodiment, the artifact 60 is positioned with the land 62 facing the imager 50, and more particularly, the line of view of the imager 50 is perpendicular to the land 62 face of the artifact. The method further includes measuring, with substantial precision, a location 24 of the artifact 60 relative to the datum 64. In other embodiments, the orientation of the artifact 60 relative to the part 20 may be known if the fixture arrangement 58 is known. The measurements may be taken by various measurement devices well known in the art such as, for example, a surface plate and dial gages, a coordinate measuring machine (CMM) or an optical scanner.

More particularly, the exemplary method for reconstructing the internal surface geometry of a part 20 includes collecting a sequence of images of the part 20 and artifact 60 using an imager 50 and generating the thickness map 30 for the part 20 and the artifact 60 from the sequence of images. The orientation of the artifact 60 relative to the part 20 remains substantially the same while the images are collected. Further, orientation of the artifact 60 relative to a coordinate system 80 of the imager 50 provides an orientation of the part 20 relative to the coordinate system 80 of the imager 50, as the orientation of the artifact 60 with the part 20 is known.

In other embodiments of the instant invention, additional artifacts and datum, similar to the ones explained above, may be incorporated, or the same artifact may be repositioned in a different orientation to facilitate imaging from different views, as discussed below.

As discussed above, the arrangement of FIG. 2 is precisely determined. Moreover, the exemplary method for reconstructing the internal surface geometry of a part 20 depicted in FIG. 2 includes irradiating the part 20 and the artifact 60 prior to collecting the sequence of images. For this exemplary embodiment, the imager 50 is an infrared ("IR") camera 50, and the thickness map 30 is an IR thickness map. For example, the part 20 and the artifact 60 may be irradiated using flash lamps 48 as a heat source. Typically, the energy is supplied in a short period of time, of the order 0.001 to 0.010 seconds, and the energy is absorbed at the surface of the part and the artifact. Other means for heating the part and artifact are also within the scope of the instant invention. The imager 50 captures the temperature decay at the sample's surface over time, and from this information the sample thickness, material properties and the presence of certain defects can be determined. More particularly, many hundreds of images forming a sequence of images, in certain cases on the order of 2000 images, are recorded to reflect the history of thermal transient process. Each image in the sequence of images captures the temperature decay at each visible point of the surface of the part or artifact, wherein the decay is also dependent on the internal structure of the part or the artifact, among other factors. Sequences of images may be collected for a number of views of the part 20, in order to cover the whole part 20. Further, to change views, another artifact 60 may be used at a new position, and the part 20 (or imager 50) may be moved relative to the imager (part). Alternatively, the same artifact 60 may be moved to the new position, and the part/imager moved relative to the imager/part. Beneficially, by obtaining sequences of images for different views, a substantially comprehensive coverage of the part is established. Analysis of the sequences of images provides the thickness information for the sub-structures of the part or the artifact.

Figure 5:
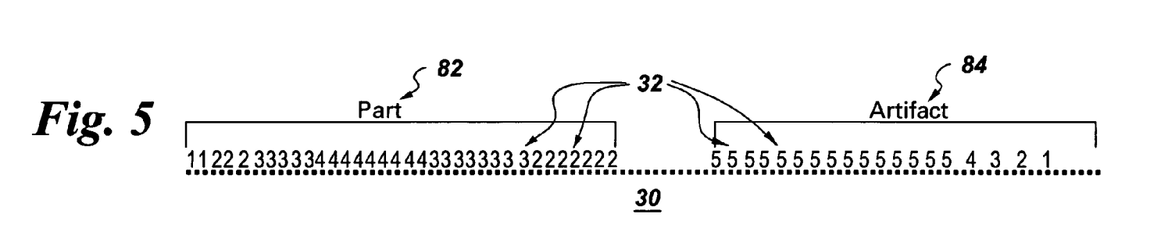
FIG. 5 shows exemplary thickness maps for the part and artifact.

The thickness map 30 is generated from the image sequence using known techniques. Exemplary thickness data 32: set of points (x, y) and corresponding thickness at the respective points are shown in FIG. 5. Logical assimilation of the thickness data 32 generates thickness map 30 for the part 20 and the artifact 60 as indicated in FIG. 5.

As discussed earlier, external surface data 40 for the part 20 may be obtained from the external surface data monitor 54. External surface data for the artifact 42 is known from the geometry data and alternatively may be obtained using the external surface data monitor 54. Beneficially, the exemplary method uses thickness map and external surface data for the part and the artifact, and knowledge of their respective orientations to reconstruct the internal surface geometry of the part 20.

Figure 6:
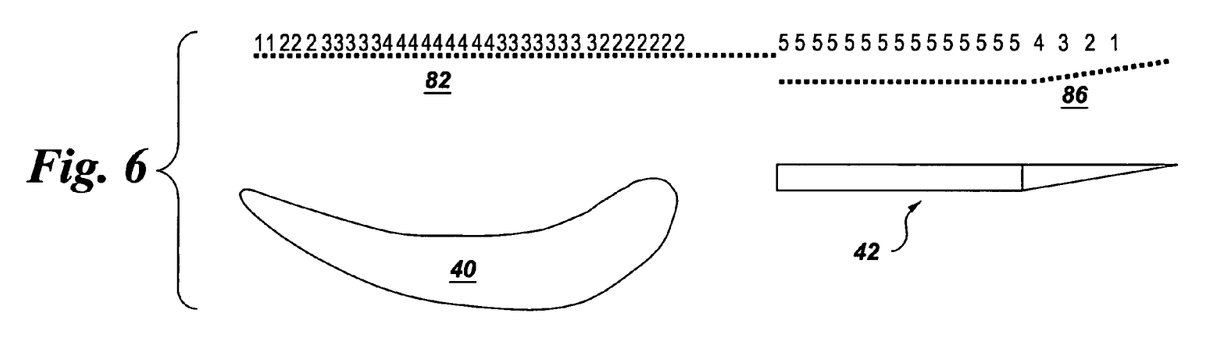
FIG. 6 shows exemplary external surface data for a part and exemplary external surface data for an artifact, with the thickness data for the artifact projected above its external surface data.
Figure 7:
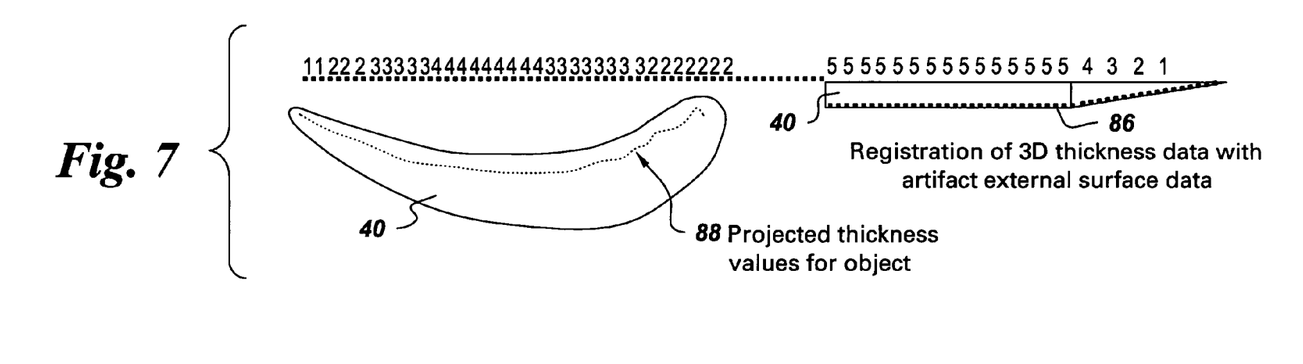
FIG. 7 shows the thickness values of the artifact best fitted onto its external surface data and the thickness map of the part registered with its external surface data.

According to a more particular embodiment, a coordinate transformation matrix is obtained from the artifact as follows. From the artifact region 84 of the 2 D thickness map 30, and 3 D external surface data 42 of the artifact, a 3 D point cloud 86 for the artifact is obtained, as illustrated in FIG. 6. This process is achieved by extrapolating the 2 D points of the thickness map 84 by the thickness distance along a plane normal to the 2 D plane representing the face of the artifact 60, since the imager 50 is oriented perpendicular to the front plane (land 62) of the artifact 60. The artifact 3 D point cloud 86, so obtained, is mapped onto the artifact's accurately known 3 D geometry data comprising its external surface data 42, as shown in FIG. 7. A coordinate transformation matrix is determined for the 'best fit' of the point cloud 86 with the external surface data 42 for the artifact. Conceptually, a coordinate transformation matrix relates the precise external surface data 42 (obtained from artifact geometry data) of the artifact to the experimentally obtained point cloud 86 of the artifact. Specifically, the coordinate transformation matrix consists of a series of numbers which are the coefficients of an equation that relates the translation and rotation changes between the experimental data 86 coordinate system of the artifact and the coordinate system used in the known geometry data of the artifact, such that, when this transformation matrix is applied to each point in the part point cloud 82, causes each point to shift in a manner to reorient each point into proper position (best fits) with the coordinate system of the imager system. This accurately aligns the thickness map 82 of the part to its external surface data. The best fitting may be mathematically achieved using a number of methods. One exemplary method is based on algorithms such as the ICP (Iterative Closest Point) algorithm, which uses point cloud to point cloud registration. Such methods need to recognize common regions on both point clouds, which may be time consuming and difficult. An alternate registration method based on the least-square minimization avoids identifying a common region, and the local optimization problem may also be used. This alternate registration method comprises a rough alignment of the point cloud 86 and geometry data, projecting for every point in the artifact point cloud 86 to the closest surface of the geometry data, and finding its corresponding projection point.

Coordinate transformation between the artifact 2 D point cloud region 84 in the thickness map 30 and artifact external surface data 42 is the same as the transformation between the part 2 D point cloud region 82 and part external surface data 40. Therefore, the coordinate transformation matrix, so obtained, may be advantageously used to reorient the plane of the part region 82 of the thickness map 30, and more specifically, the part region 82 is accurately oriented to the external surface data 40 of the part 20. Once oriented, the thickness data elements corresponding to the part region 82 are projected onto the part surface. The thickness data elements 82 are then extrapolated, according to the thickness values registered in the thickness map 30. This results in 3 D inner surface data 12 for the part 20, representing its internal features. The 3 D inner surface data 12, so obtained, is logically assimilated to arrive at the internal surface geometry 10 of the part.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for reconstructing an internal surface geometry of a part, said method comprising:
   registering a thickness map for the part with a plurality of external surface data for the part, the thickness map comprising a plurality of thickness data; and
   generating a plurality of internal surface data using the thickness map and the external surface data.

2. The method of claim 1, further comprising:
   collecting a sequence of images of the part; and
   generating the thickness map for the part from the sequence of images,
wherein said collecting and generating are performed prior to said registering.

3. The method of claim 2, further comprising:
   orienting at least one artifact relative to the part; and
   determining an orientation of the artifact relative to a coordinate system of an imager,
wherein the images are of the part and the artifact, wherein the sequence of images are collected using the imager, and wherein the orientation of the artifact relative to the part remains substantially the same during said collecting step.

4. The method of claim 3, wherein the artifact has a known geometry.

5. The method of claim 3, wherein the orientation of the artifact relative to the coordinate system of the imager provides an orientation of the part relative to the coordinate system of the imager, and wherein said registering includes using the orientation of the part relative to the coordinate system of the imager to register the thickness data to the respective external surface data.

6. The method of claim 5, further comprising generating an artifact thickness map for the artifact from the sequence of images, wherein said determining the orientation of the artifact relative to a coordinate system of the imager includes using the artifact thickness map and a plurality of external surface data for the artifact.

7. The method of claim 5, wherein said orienting of each of the at least one artifacts comprises:
   selecting at least one datum on the part; and
   attaching the artifact to the part at the at least one datum.

8. The method of claim 7, further comprising determining a location of the artifact relative to each of the at least one datum, wherein said determining is performed for each of the at least one artifacts.

9. The method of claim 8, wherein said determining the location comprises mounting the artifact on a fixture arrangement to provide precision fixturing.

10. The method of claim 8, wherein said determining the location further comprises measuring the location of the artifact relative to each of the at least one datum.

11. The method of claim 7, wherein each of the at least one artifact comprises:
    at least one land comprising a substantially planar surface and forming a respective face of the artifact; and
    at least one wedge that is a substantially planar surface and forms a respective face of the artifact, wherein each of the at least one wedge intersects a respective one of the at least one land at an angle.

12. The method of claim 11, wherein each of the at least one artifacts further comprises at least one hole, and wherein said method further comprises aligning the artifact relative to the imager using the at least one hole.

13. The method of claim 11, wherein the artifact is positioned with one of the at least one lands facing the imager.

14. The method of claim 5, wherein the imager comprises an infrared ("IR") camera, said method further comprising irradiating the part and the artifact prior to collecting the sequence of images, wherein the thickness map is an IR thickness map.

15. The method of claim 14, wherein said irradiating comprises flashing the part and the artifact.

16. The method of claim 5, wherein said collecting comprises collecting the images for a plurality of views of the part.

17. An inspection method for reconstructing an internal surface geometry for a part, said inspection method comprising:
    obtaining a plurality of external surface data for the part;
    collecting a sequence of images of the part using an imager;
    generating a thickness map for the part from the sequence of images, the thickness map comprising a plurality of thickness data;
    registering the thickness map with the external surface data; and
    generating a plurality of internal surface data using the thickness map and the external surface data.

18. The inspection method of claim 17, further comprising irradiating the part prior to collecting the sequence of images, wherein the thickness map is an IR thickness map.

19. The inspection method of claim 18, further comprising:
orienting at least one artifact relative to the part;
generating an artifact thickness map for the artifact from the sequence of images,
wherein the images are of the part and the artifact; and
determining an orientation of the artifact relative to a coordinate system of the imager using the artifact thickness map and a plurality of external surface data for the artifact,
wherein the orientation of the artifact relative to the coordinate system of the imager provides an orientation of the part relative to the coordinate system of the imager.

20. The inspection method of claim 19, wherein said orienting of each of the at least one artifacts comprises:
selecting at least one datum on the part;
attaching the artifact to the part at the at least one datum; and
determining a location of the artifact relative to each of the at least one datum,
wherein said determining is performed for each of the at least one artifacts.

21. The inspection method of claim 20, wherein each of the at least one artifacts comprises:
at least one land that is a substantially planar surface and forms a respective face of the artifact;
at least one wedge that is a substantially planar surface, intersects the land at an angle, and forms a respective side of the artifact; and
at least one hole,
wherein said method further comprises aligning the artifact relative to the imager using the at least one hole.

22. The inspection method of claim 21, wherein the artifact is positioned with one of the at least one lands facing the imager.

23. The inspection method of claim 21, wherein said collecting comprises collecting the images for a plurality of views of the part.

24. An inspection system for reconstructing an internal surface geometry of a part, the inspection system comprising:
at least one artifact having a known geometry and a plurality of known dimensions;
at least one fixture arrangement for positioning said at least one artifact relative to the part;
an imager for obtaining a plurality of thickness data of the part and the artifact; and
at least one lamp for irradiating the at least one artifact and the part prior to obtaining the thickness data.

25. The inspection system of claim 24, further comprising an external surface data monitor for obtaining a plurality of external surface data.

26. The inspection system of claim 25, further comprising a computer for generating a plurality of internal surface data using a thickness map and a plurality of external surface data.

27. The inspection system of claim 26, wherein said computer is further configured for generating the thickness map from the thickness data obtained using said imager and for registering the thickness map to the external thickness data.

* * * * *